United States Patent
Servadei et al.

(10) Patent No.: US 12,380,589 B2
(45) Date of Patent: Aug. 5, 2025

(54) METHOD AND APPARATUS TO EVALUATE RADAR IMAGES AND RADAR DEVICE

(71) Applicant: Infineon Technologies AG, Neubiberg (DE)

(72) Inventors: Lorenzo Servadei, Munich (DE); Avik Santra, Munich (DE)

(73) Assignee: Infineon Technologies AG, Neubiberg (DE)

(*) Notice: Subject to any disclaimer, the term of this patent is extended or adjusted under 35 U.S.C. 154(b) by 396 days.

(21) Appl. No.: 17/827,340

(22) Filed: May 27, 2022

(65) Prior Publication Data
US 2022/0383537 A1    Dec. 1, 2022

(30) Foreign Application Priority Data
May 28, 2021 (EP) ..................... 21176504

(51) Int. Cl.
*G06T 7/70* (2017.01)
*G01S 13/89* (2006.01)
(Continued)

(52) U.S. Cl.
CPC .............. *G06T 7/70* (2017.01); *G01S 13/89* (2013.01); *G06T 3/10* (2024.01); *G06T 7/277* (2017.01);
(Continued)

(58) Field of Classification Search
CPC .. G06T 7/70; G06T 7/277; G06T 3/10; G06T 2207/10028; G06T 2207/20081; G06T 2207/20084; G01S 13/89
See application file for complete search history.

(56) References Cited

U.S. PATENT DOCUMENTS

| | | | | |
|---|---|---|---|---|
| H1720 H | * | 4/1998 | Chen ................... | G01S 13/9029 |
| | | | | 342/25 E |
| 2020/0363519 A1 | * | 11/2020 | Beise .................... | G01S 13/584 |
| 2021/0156963 A1 | * | 5/2021 | Popov ................... | G06N 3/045 |

FOREIGN PATENT DOCUMENTS

| | | | | |
|---|---|---|---|---|
| CN | 108921879 A | * | 11/2018 | ........... G06N 3/0454 |
| EP | 3968013 A1 | * | 3/2022 | ........... G01N 23/046 |

(Continued)

OTHER PUBLICATIONS

Lohn, A., "Estimating the Brittleness of AI: Safety Integrity Levels and the Need for Testing Out-Of-Distribution Performance," arXiv:2009.00802v1 [cs.LG], Sep. 3, 2020, 15 pages.
(Continued)

*Primary Examiner* — Vladimir Magloire
*Assistant Examiner* — Maxine McKenzie Phillips
(74) *Attorney, Agent, or Firm* — Slater Matsil, LLP

(57) ABSTRACT

In an embodiment, a method to evaluate radar images includes providing a first raw radar image and a second raw radar image and determining, whether a reliability criterion is fulfilled. The method further includes using a first coordinate and a second coordinate output by a trained neural network as an estimate of a position of an object if the reliability criterion is fulfilled, the trained neural network using the first raw radar image and the second raw radar image as an input. The method further includes using a third coordinate and a fourth coordinate output by another radar processing pipeline as the estimate of the position of the object if the reliability criterion is not fulfilled, the radar processing pipeline using the first raw radar image and the second raw radar image as an input.

20 Claims, 5 Drawing Sheets

(51) Int. Cl.
*G06T 3/10* (2024.01)
*G06T 7/277* (2017.01)

(52) U.S. Cl.
CPC .............. *G06T 2207/10028* (2013.01); *G06T 2207/20081* (2013.01); *G06T 2207/20084* (2013.01)

(56) References Cited

FOREIGN PATENT DOCUMENTS

| JP | 2004535564 A | * | 11/2004 | | |
| WO | WO-2017097964 A1 | * | 6/2017 | ............. | G06T 7/251 |
| WO | WO-2022045915 A1 | * | 3/2022 | ............. | G06F 18/22 |
| WO | WO-2022201447 A1 | * | 9/2022 | ............. | G06N 20/00 |

OTHER PUBLICATIONS

Stephan, M. et al., "Radar Image Reconstruction from Raw ADC Data using Parametric Variational Autoencoder with Domain Adaptation," 2020 25th International Conference on Pattern Recognition (ICPR), Jan. 10-15, 2021, 8 pages.

* cited by examiner

METHOD AND APPARATUS TO EVALUATE RADAR IMAGES AND RADAR DEVICE

CROSS-REFERENCE TO RELATED APPLICATIONS

This application claims the priority benefit of European Application No. 21176504, filed on May 28, 2021, which application is hereby incorporated herein by reference.

TECHNICAL FIELD

Some embodiments relate to a method and an apparatus to evaluate radar images and to radar devices.

BACKGROUND

Radar images are in many applications analyzed to determine the position and further kinematic parameters of objects within the field of view of a radar sensor. For example, a signal processing pipeline involving multiple subsequent processing steps can be used to determine the position of objects within multiple subsequent radar images to, for example, track the object. However, the computations within those signal processing pipelines are computationally challenging, which often results in increased processing latency if energy efficient hardware is required or in abundant energy consumption when low latency is to be achieved. Both tradeoffs may be undesirable, for example in mobile or vehicle safety applications.

Hence, there is a demand to improve the evaluation of radar images to determine positions of objects.

SUMMARY

An embodiment relates to a method to evaluate radar images. The method comprises providing at least a first raw radar image and a second raw radar image and determining, whether a reliability criterion is fulfilled. The method further comprises using a first coordinate and a second coordinate output by a trained neural network as an estimate of a position of an object if the reliability criterion is fulfilled, the trained neural network using the first raw radar image and the second raw radar image as an input. Further, the method comprises using a third coordinate and a fourth coordinate output by another radar processing pipeline as the estimate of the position of the object if the reliability criterion is not fulfilled, the radar processing pipeline using the first raw radar image and the second raw radar image as an input. Using an embodiment of the method, position estimates for objects can be determined with low latency and low energy consumption if the reliability criterion is fulfilled. The reliability criterion may, for example, impose minimum requirements of the quality of the position estimate by the trained neural network. In some embodiments, a further radar processing pipeline, which may be more time or energy consuming, may only be used in circumstances when the reliability criterium so requires, possibly resulting in an overall lower energy consumption and higher processing speed as compared to an approach using, for example, only the further radar processing pipeline.

Similarly, an apparatus for evaluating radar images comprises an input interface for receiving at least a first raw radar image and a second raw radar image. The apparatus further comprises circuitry configured to determine, whether a reliability criterion is fulfilled and to use a first coordinate and a second coordinate output by a trained neural network as an estimate of a position of an object if the reliability criterion is fulfilled, the trained neural network using the first raw radar image and the second raw radar image as an input. Further, the circuit is configured to use a third coordinate and a fourth coordinate output by another radar processing pipeline as the estimate of the position of the object if the reliability criterion is not fulfilled, the radar processing pipeline using the first raw radar image and the second raw radar image as an input. Position estimates for objects can be determined with low latency and energy consumption if the reliability criterion is fulfilled. In some embodiments, a more time and energy consuming further radar processing pipeline may only be required in rare circumstance when the reliability criterium so requires.

BRIEF DESCRIPTION OF THE DRAWINGS

Some examples of apparatuses and/or methods will be described in the following by way of example only, and with reference to the accompanying figures, wherein.

DETAILED DESCRIPTION OF ILLUSTRATIVE EMBODIMENTS

Figure 1:
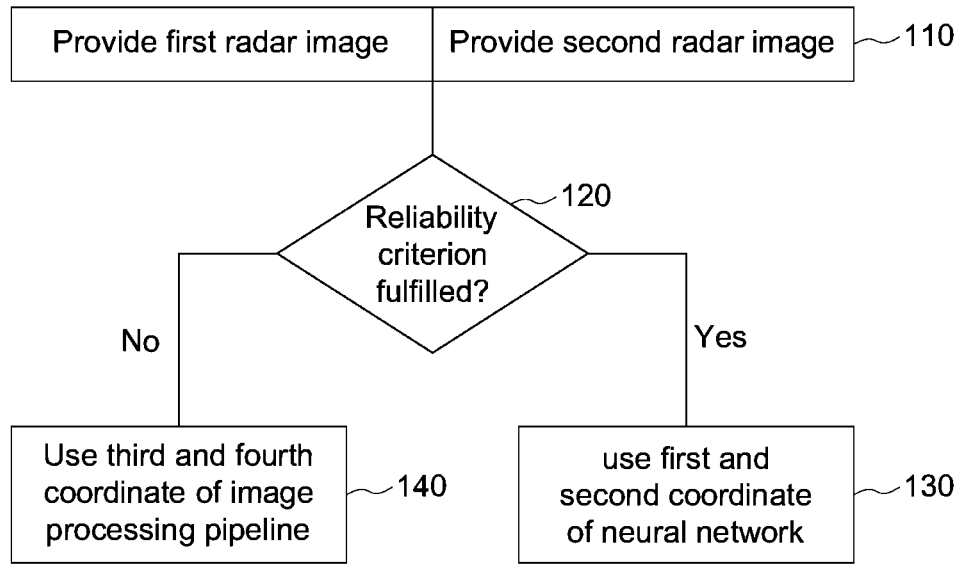
FIG. 1 illustrates a flowchart of an embodiment of a method to evaluate radar images.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or,' this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a," "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include," "including," "comprise" and/or "comprising," when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a flowchart of an embodiment of a method to evaluate radar images.

Initially, at least a first raw radar image and a second raw radar image are provided 110. According to the method, it is determined, whether a reliability criterion is fulfilled in 120.

If the reliability criterion is fulfilled, a trained neural network is used to estimate the position of an object 130 by outputting a first coordinate and a second coordinate.

If, however, the reliability criterion is not fulfilled, a third coordinate and a fourth coordinate output by another radar processing pipeline is used as the estimate of the position of the object 140.

Using an embodiment as illustrated in FIG. 1, position estimates for objects can be determined with low latency and energy consumption if the reliability criterion is fulfilled. Depending on the reliability criterion, this may be the case in most of the attempts to estimate positions of objects. In some embodiments, a more time and/or energy consuming further radar processing pipeline may only be required in rare circumstance when the reliability criterium so requires. Using an embodiment as illustrated in FIG. 1 may, therefore, result in position estimation using based on raw radar images with an overall lower energy consumption and higher processing speed as compared to an approach using, for example, only the further radar processing pipeline. Low energy consumption at high processing speeds may be a key aspect for implementing position estimation based on radar images in various applications, as for example in automotive applications, monitoring of movement of people or monitoring of hand and/or body movement for gesture based user interfaces. Low energy consumption may also be highly beneficial in Internet of Things (IoT) applications or in consumer electronics applications. For example, IoT devices may be controlled using an embodiment of a method to evaluate radar images, which may, in turn, enable to dispense with conventional user interfaces. Likewise, consumer electronic devices like personal digital assistants, TV sets and all kind of home appliances may be controlled in an energy efficient manner, allowing to also implement the control in battery powered devices.

In other words, FIG. 1 illustrates a deep learning based radar localization solution having the possibility to fall back to a conventional radar processing pipeline if the deep learning approach is not productive or delivering the desirable results.

Figure 2:
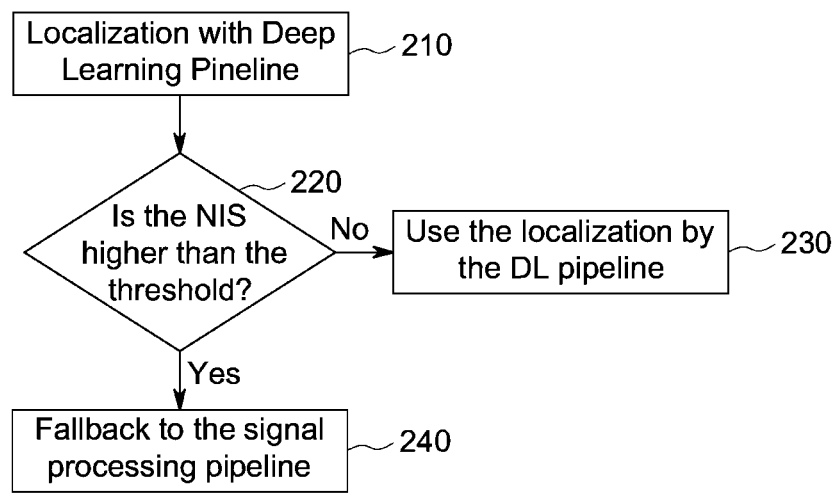
FIG. 2 illustrates a flowchart of a further embodiment of a method to evaluate radar images.

The determination, whether a reliability criterion is fulfilled, can be implemented in various ways. FIG. 2 shows one example in which the position estimation using the trained neural network is always performed and the position estimation by the trained neural network is evaluated afterwards, to determine, whether the output is reliable or not.

As illustrated in FIG. 2, the trained neural network continuously performs position estimation. Evaluating the reliability criterion 220 is performed by comparing the position estimation performed by the trained neural network with an estimation of a track of the object. The track of the object can be predicted based on preceding position estimates. For tracking and track prediction, a Kalman filter can be used, for example. In the embodiment illustrated in FIG. 2, the reliability criterion is not fulfilled if a deviation of the position estimation of the trained neural network and an estimated track of the object is higher than a threshold. The threshold may, for example, be based on a normalized innovation square (NIS) as a metric.

Like in the embodiment illustrated in FIG. 1, the position estimation of the trained neural network is used (230) if the reliability criterion is fulfilled while the position estimation of the further imaging processing pipeline is used (240) if the reliability criterion is not fulfilled.

In other words, some embodiments use normalized innovation square (NIS) as a metric to determine if a switch from the trained neural network to a further signal processing pipeline should happen. First, a neural network is trained and deployed. In an application specific manner, a threshold may be determined as a reliability criterion according to the requirements of, e.g., an algorithm designer. The first step is, e.g., always using the deep learning pipeline, i.e. the trained neural network. To discover the reliability of the output, the result provided by the DL pipeline in terms of NIS is retrieved. If something is found to not work properly, the system falls back gracefully to a standard signal processing algorithm, e.g., to a further radar processing pipeline. This may allow smoothness in the application itself.

In further embodiments, reinforcement learning may be used to determine when the trained neural network and when the further signal processing pipeline should be used. In some embodiments, to achieve this, a separate additional neural network may be trained upfront to decide whether the trained neural network or the further signal processing pipeline are to be used for the given input data, where the input data comprises the first raw radar image and the second raw radar image. Using the additional neural network enables the decision before the trained neural network itself is used, saving execution time and speeding up the position estimation process.

Further embodiments may use an output of the trained neural network itself to determine whether the output is reliable or not. During training, a neural network can learn when training data is out of the distribution of the input data to be expected. In such an event the trained neural network learns to give a respective note indicating an out of distribution error. In case the trained neural network indicates an out of distribution error, one may, therefore, conclude, that the reliability criterion is not fulfilled and that the output of the trained neural network is not reliable to fall back to the further radar processing pipeline. One particular example for robust out of distribution detection is an algorithm called ALOE, which performs robust training by exposing the model to both adversarially crafted inlier examples and outlier examples. In some embodiments, an inlier example is training data based on a sample of the distribution of data $D_{in}^{train}$ the neural network is to train on. However, the sample is artificially altered to make the neural network (e.g., a classifier) to output a low likelihood that the inlier example belongs to the distribution. Similarly, an outlier example is training data based on a sample outside of the distribution of data the neural network is to train on (from a distribution of outliers $D_{out}^{OE}$), artificially altered to make the neural network (e.g. a classifier) to output a high likelihood that the outlier example belongs to the distribution (e.g. by means of a softmax output). According to an example of the ALOE algorithm, a training objective may be defined to be:

$$\underset{\theta}{\text{minimize}}$$

$$\mathbb{E}_{(x,y)\sim\mathcal{D}_{in}^{train}}\left[-\log F_\theta(x+\delta)_y + \lambda \cdot \mathbb{E}_{x\sim\mathcal{D}_{out}^{OE}} \max_{\delta \in B_{out}^{OE}}[L_{CE}(F_\theta(x+\delta), \mathcal{U}_K)]\right.$$

with $F_\theta(x)$ being the softmax output of the neural network.

In summary, according to further embodiments, the reliability criterion is not fulfilled if an output of the trained neural network itself indicates an out of distribution error.

Figure 3:
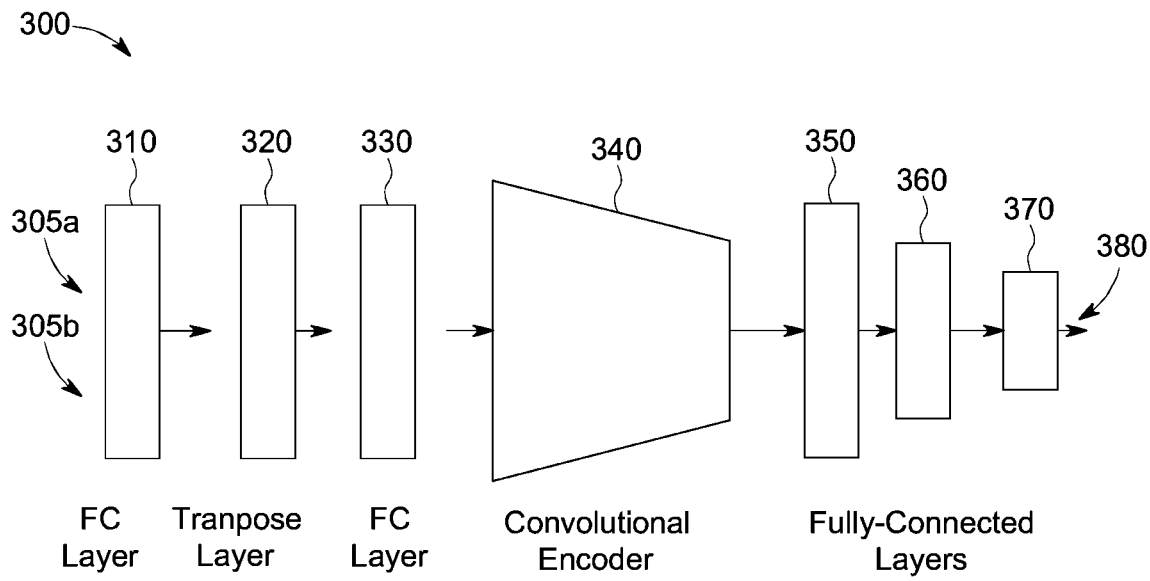
FIG. 3 illustrates an example of a topology of a neural network used in some embodiments.

FIG. 3 illustrates an example of a topology of a trained neural network 300 used in some embodiments. Neural network topologies can be described by multiple interconnected layers. Alternative network topologies having modified or different layers in a like or different order may likewise be used for the same purpose in further embodiments. In some embodiments, an input to the trained neural network 300 is a first raw data image 305a second raw data image 305b.

In the illustrated example, the trained neural network 300 comprises a Fully Connected (FC) layer 310 as an input layer, a subsequent transpose layer 320, and a further fully connected layer 330 downstream the transpose layer 320. Downstream the FC layer 330 follows a convolutional encoder 340, followed by three subsequent FC layers 350, 360, and 370.

At an output of the trained neural network 300, a first coordinate and a second coordinate are provided as an estimate of a position of every object in the field of view of the associated radar sensor(s) generating the first raw data image 305a and the second raw data image 305b.

Figure 4:
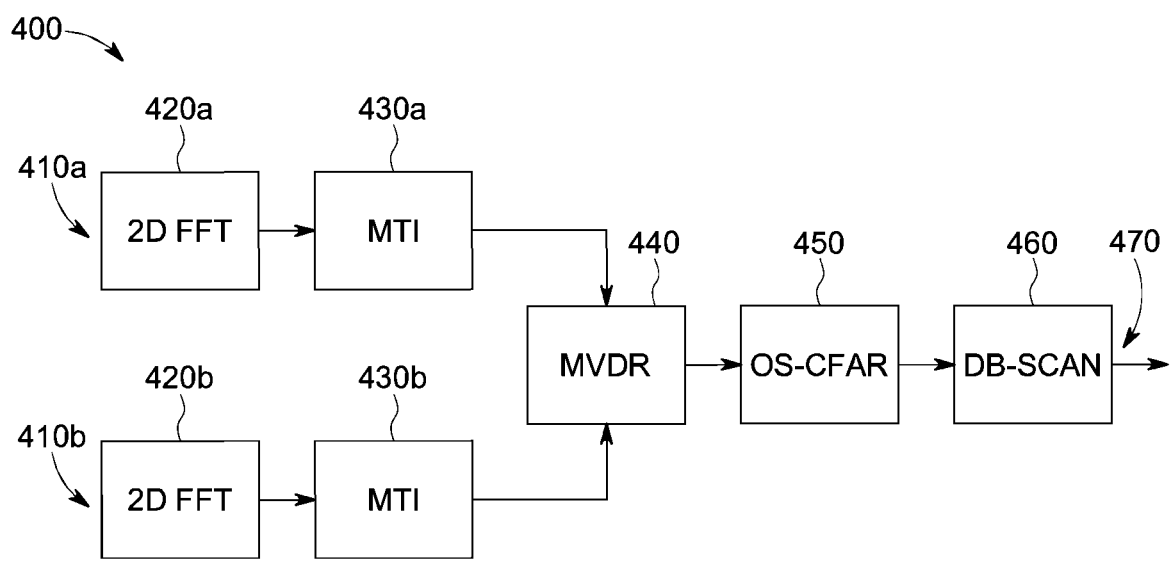
FIG. 4 illustrates an example of a further radar processing pipeline used in some embodiments.

FIG. 4 illustrates an example of a further and conventional radar processing pipeline 400 which may be used as a fallback in some embodiments. A conventional radar processing pipeline uses multiple subsequent radar processing steps to localize radar targets (objects within the field of view of a radar device). Alternative radar processing pipelines having modified or different imaging processing steps in a like or modified order may likewise be used for the same purpose. To this end, the illustration of FIG. 4 shall only be understood as one example for a conventional imaging processing pipeline which may serve as a fallback for a trained neural network.

In the radar processing pipeline 400, a first raw radar image 410a is input into a first two-dimensional Fourier transform 420a to transform the raw radar image 410a into a range/doppler representation. In a frequency modulated continuous wave (FCMW) radar system, raw radar images are, for example, a two-dimensional representation of responses to multiple subsequent radar-sweeps, one dimension being the frequency, the other dimension being the number of the sweep. By using the two-dimensional Fourier transform 420a, a raw radar image may be converted into a two-dimensional range/Doppler representation, in which one dimension is the distance and the other dimension is the relative velocity with respect to the radar sensor.

Subsequently, the image is undergoing moving target indication (MTI) 430a. MTI serves to discriminate a target against the clutter. MTI may be done using a variety of techniques used to find moving objects, like an aircraft or a vehicle and filter out unmoving ones, like hills or trees.

Likewise, a second raw data image 410b is input into a second two-dimensional Fourier transform 420b and subsequently subject to MTI 430b.

In order to perform localization, i.e., to determine at least a first coordinate and a second coordinate of an observed object, at least two images generated using two different antennas can be combined. To this end, the separate pipelines pre-processing the raw radar images 410a and 410b are merged in a Minimum Variance Distortionless Response (MVDR) beamformer 440, also known as Capon beamforming algorithm. Downstream the MVDR beamformer 440, a first coordinate and a second coordinate for objects within the field of view of a radar sensor can principally be derived. Depending on the implementation requirements, the coordinate system may be chosen to the user's preference. For example, the coordinates may be given as X, Y in a Cartesian coordinate system, or, as distance r and an angle φ in a polar coordinate system.

In conventional radar implementations, antenna arrays having multiple receiver antennas are often used and, hence, multiple raw data images are pre-processed by the previously illustrated steps of two-dimension Fourier transform and MTI. While more antennas may increase the resolution of the system, the pre-processing of only two raw data images 410a and 410b is illustrated in FIG. 4 for reasons of simplicity.

To avoid false detections of objects, the image data is input into an Ordered Statistics Constant False Alarm Rate (OS-CFAR) algorithm 450 downstream MVDR 440. OS-CFAR is only one example for multiple usable CFAR algorithms. It is an important task in radar signal processing to reliably detect objects in the surrounding of the radar sensor at the presence of noise. This can be done by comparing the frequency spectrum of the measured signal to a specific detection threshold. Using a constant threshold value may cause many wrong object detections. Constant false alarm rate (CFAR) algorithms, instead, can calculate an adaptive threshold value due to the estimated noise floor. Since the CFAR algorithms are adapted to a specific noise model, the detection performance becomes insensitive of the Gaussian background noise power. At an output of OS-CFAR algorithm 450, noise levels in the image data can be strongly decreased.

Downstream OS-CFAR algorithm 450, the image data is input into a Density-Based Spatial Clustering of Applications with Noise (DBSCAN) algorithm 460. DBSCAN is a density-based clustering non-parametric algorithm that groups together points that are closely packed together (points with many nearby neighbors), marking also outlier points that lie alone in low-density regions. At an output of the DBSCAN algorithm 460, clusters of pixels are formed within an image, each cluster corresponding to an observed real physical object. Consequently, at least two coordinates can be provided as an estimate of the position of every object in the field of view of the associated radar sensor(s) at an output 470 of the radar processing pipeline 400.

While the object detection and localization using the radar processing pipeline in FIG. 4 may be reliable, it is apparent that the multiple complex processing steps described may require a significant amount of computational resources.

While the previous figures illustrated various embodiments as to how to provide the possibility to fall back from a trained neural network to a conventional radar processing pipeline, FIGS. 5 and 6 subsequently illustrate two different approaches to further increase the quality of the trained neural network during operation. Both approaches mainly differ in the location, where the model of the trained neural network is enhanced. Both embodiments are based on the embodiment illustrated in FIG. 2 and, hence, the aspects relating to the fallback mechanism itself, which are associated with reference numerals 210, 220, 230, and 240 are not repeated. Instead, the discussion will focus on the aspects related to the possibility to enhance the model of the trained neural network during operation.

Figure 5:
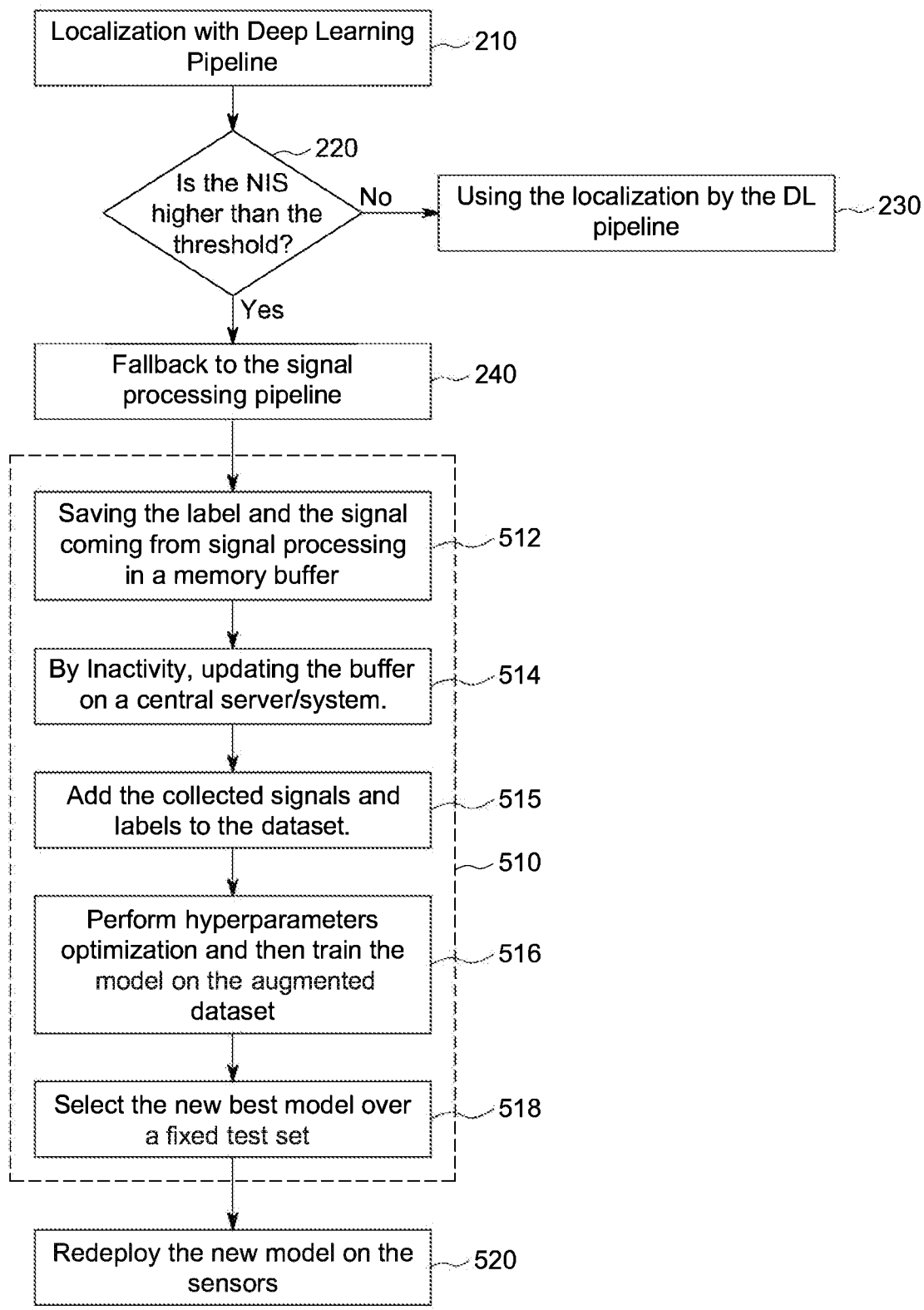
FIG. 5 illustrates a flowchart of an embodiment of a method to evaluate radar images further using federated learning.

FIG. 5 illustrates a flowchart of an embodiment of a method to evaluate radar images further using continual learning to increase the quality of the model of the trained neural network.

Continual learning as described in the flowchart of FIG. 5 increases the quality of a jointly used model using and merging data from multiple entities employing the model, even if the entities use the model independently from one another. In other words, for continual learning, data can be considered as a stream, where learning from each new sample would impact minimally or improving the prediction on previous samples.

In some embodiments, to enable continual learning, the first raw radar image, the second raw radar image, and the conventional estimate of the position of the object must be used to further train the neural network by computing updated neural network parameters. To enable further training 510, an entity implementing an embodiment of a method to evaluate radar images saves the conventional estimate of the position as well as the corresponding first and second raw radar images (512) if the reliability criterion was not fulfilled. If position estimation is not performed such that the associated resources can be used differently, the stored data is submitted to a central entity, e.g., to a central server or system, on which the further training of the model of the neural network is performed. The submitted data, i.e., the first raw radar image, the second raw radar image, and the conventional estimate of the position of the object are added to the already existent training data on the central entity. Based on the so updated training data, the model of the neural network is trained (516) and the best model having updated neural network parameters is chosen (518). The updated newsletter parameters are redistributed (520) to all entities implementing the trained neural network.

For supporting continual learning, associated entities need to support the transfer of the stored raw radar images and their associated conventional estimates of object positions to the central entity and, likewise, support receiving updated neural network parameters from said central entity.

In other words, continual learning exploits the experience of different sensors in terms of mis-prediction for optimizing hyperparameters of a new central model. The new model having updated neural network parameters, performing best on a fixed test set is redeployed on the sensors. In case multiple entities (edge devices) use the same neural network, a copy of a centrally trained model is deployed on a series of edge devices. In some embodiments, each edge device might have to fallback to the signal processing system for different events. Such inputs on the failed signal are stored in a buffer, and are periodically uploaded on a central computation entity (e.g., a server). New contributions on failed signals from different devices are added to a central dataset, together to the label given by the signal processing fallback. Hyperparameter optimization is realized (incl. on the Network Layers) and the best performing network on the central dataset is then deployed to all the edge devices.

Figure 6:
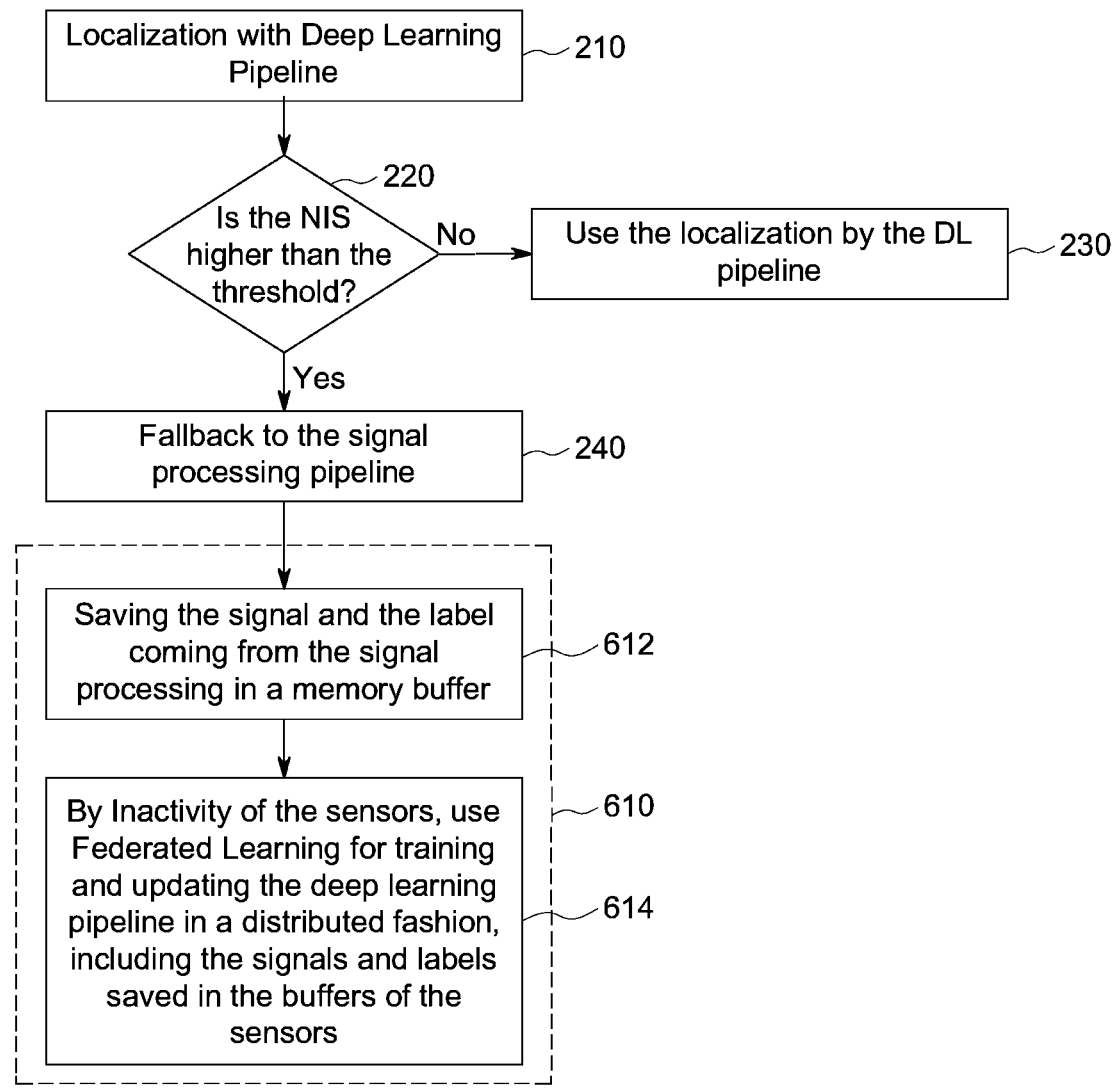
FIG. 6 illustrates a flowchart of an embodiment of a method to evaluate radar images further using continual learning.

FIG. 6 illustrates a flowchart of an embodiment of a method to evaluate radar images further using federated learning to increase the quality of the model of the trained neural network.

Using federated learning, the updated neural parameters are computed on each individual entity independently from other entities using the same neural network and a new common model is periodically generated based on multiple slightly different updated neural network parameters. Like in continual learning illustrated in FIG. 5 and to enable further learning 610, an entity implementing an embodiment of a method to evaluate radar images saves the conventional estimate of the position as well as the corresponding first and second raw radar images (614) if the reliability criterion was not fulfilled. Based on the saved data, the model of the neural network is trained (614) and each entity itself, generating updated neural network parameters at every entity (edge device). If multiple independent entities or radar sensors perform federated learning, every radar sensor will so result with slightly different updated neural network parameters. To generate a consistent updated model, every participating entity periodically provides its updated neural network parameters to a central entity that computes an updated model from that input. One particularly simple example would be averaging the corresponding parameters of every participating entity. Finally, the updated model is redistributed to the participating entities by means of common updated neural network parameters.

In other words, using federated learning, a copy of a centrally trained model is deployed on a series of edge devices. Each edge device might have to fallback to the signal processing system for different events. Such inputs on the failed signals are stored in a buffer, and edge devices are trained on those when there are resources available. Periodically, parameters of different edge devices are uploaded into a central model, and statistics over them are taken (e.g. averaging parameters out). The parameters are then redeployed on each edge device.

In some embodiments, an entity supporting federated learning has the capability to transmit updated network parameters to a central entity as well as to receive updated parameters to a central entity.

Figure 7:
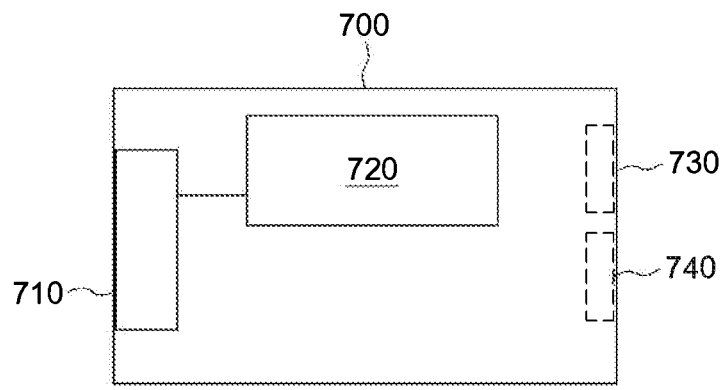
FIG. 7 illustrates a block diagram of an embodiment of an apparatus for evaluating radar images.

FIG. 7 illustrates a block diagram of an embodiment of an apparatus 700 for evaluating radar images. The apparatus comprises an input interface 710 for receiving at least a first raw radar image and a second raw radar image. Further, the apparatus needs to have the capability to implement an embodiment of the previously described methods. To this end, an embodiment of apparatus 700 comprises circuitry 720 (e.g., a generic or custom processor or controller) configured to determine whether a reliability criterion is fulfilled. The circuitry 720 is further configured to use a first coordinate and a second coordinate output by a trained neural network (e.g., 300) as an estimate of a position of an object if the reliability criterion is fulfilled, where the trained neural network uses the first raw radar image and the second raw radar image as an input. Further, the circuitry 720 is configured to use a third coordinate and a fourth coordinate output by another radar processing pipeline (e.g., 400) as the estimate of the position of the object if the reliability criterion is not fulfilled, the radar processing pipeline using the first raw radar image and the second raw radar image as an input.

Apparatus 700 as illustrated in FIG. 7 may, for example, be implemented within a radar sensor or as an additional device to be combined with radar sensors generating the raw radar images. To this end, an embodiment of an apparatus 700 may be combined with an already existent radar sensor to decrease energy consumption or to increase performance of the resulting system. According to other implementations, apparatus 700 may be implemented within a radar sensor to form a single device with enhanced capabilities. For example, the circuitry 720 may be implemented in the same semiconductor die or processor used by other signal processing algorithms of the radar sensor. Alternatively, the circuitry implementing the apparatus 700 may be implemented as a separate chip within a radar sensor comprising multiple chips within a single housing.

Optionally and to support federated and/or continual learning, some embodiments also comprise an input/output interface 730 configured to send or receive updated neural network parameters.

To support the evaluation of the reliability criterion as illustrated in FIG. 2, in some embodiments of apparatus 700 circuitry 720 may optionally be further configured to determine an estimation of a track of an object.

Further embodiments may additionally comprise an output interface 740 for transmitting at least one of the estimates of the position of the object or the track of the object to provide the position estimates generated by apparatus 700 to further processing entities, for example to an electrical control unit (ECU) cooperating multiple apparatuses 700 in parallel.

Figure 8:
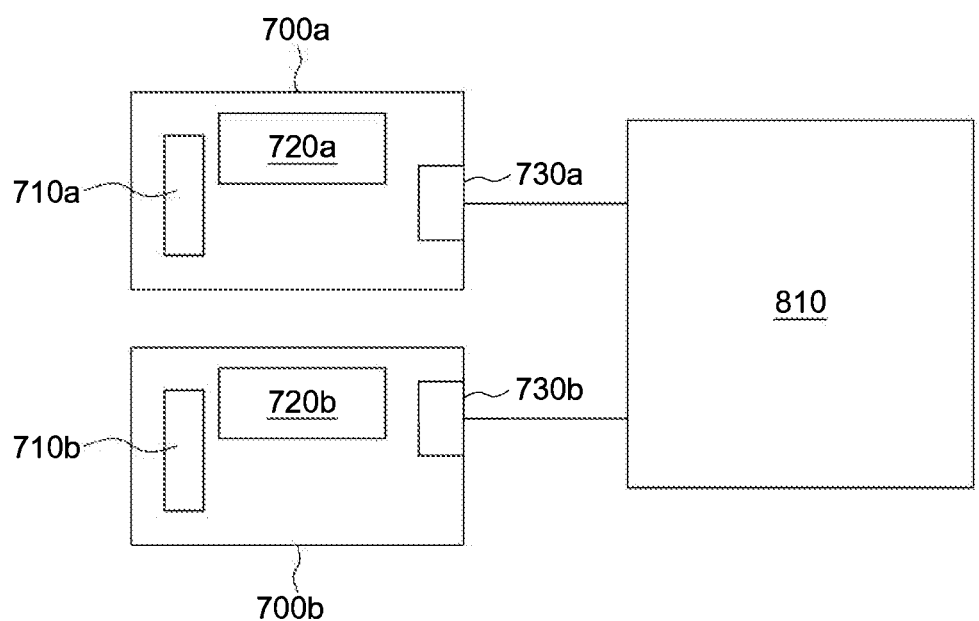
FIG. 8 illustrates a block diagram of a system comprising at least two apparatuses of FIG. 7 and a central entity.

FIG. 8 illustrates a block diagram of a system comprising at least two apparatuses 700a and 700b as illustrated in FIG. 7 and a central entity 810 to illustrate a system using continual learning as illustrated in FIG. 5 or federated learning as illustrated in FIG. 6.

In the event of continual learning, the input/output interfaces 730a and 730b transmit stored raw radar images and their associated position estimates of the radar processing pipeline to the central entity 810 to enable the central entity 810 to compute (e.g., 510, 610) updated neural network parameters by further training the model of the neural network. Further, the input/output interfaces 700a and 700b serve to receive the updated model by means of commonly used updated neural network parameters from the central entity 810.

In the event of federated learning, the input/output interfaces 730a and 730b transmit individually updated neural network parameters to the central entity 810. The central entity 810 combines the received updated neural network parameters to generate commonly used updated neural network parameters for redistributing them to the apparatuses 700a and 700b via their input/output interfaces 700a and 700b.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor-, or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method to evaluate radar images, the method comprising:
   providing first and second raw radar images;
   determining whether a reliability criterion is fulfilled;
   in response to the reliability criterion being fulfilled, generating, by a trained neural network, first and second coordinates based on the first and second raw radar images, the first and second coordinates being indicative of an estimate of a position of an object, wherein the first and second coordinates are generated at an output of the trained neural network; and
   in response to the reliability criterion not being fulfilled, generating, by a radar processing pipeline different from the trained neural network, third and fourth coordinates based on the first and second raw radar images, the third and fourth coordinates being indicative of the estimate of the position of the object, wherein the radar processing pipeline does not include a neural network, and the radar processing pipeline is inactive when the reliability criterion is fulfilled.

2. The method of claim 1, wherein the reliability criterion is fulfilled when a deviation of the position from an estimated track of the object is smaller than a threshold.

3. The method of claim 2, wherein the reliability criterion is not fulfilled when the output of the trained neural network or an output of an additional trained neural network indicates an out of distribution error.

4. The method of claim 2, further comprising tracking the object using a Kalman filter, wherein the reliability criterion is fulfilled when the deviation of the position from an output of the Kalman filter is smaller than the threshold.

5. The method of claim 2, wherein the threshold is based on a normalized innovation square (NIS).

6. The method of claim 1, wherein the radar processing pipeline is configured to perform a transformation of the first and second raw radar images into a range/Doppler representation.

7. The method of claim 1, further comprising using the first raw radar image, the second raw radar image, and the third and fourth coordinates to further train the trained neural network and to compute updated neural network parameters.

8. The method of claim 7, further comprising transmitting the updated neural network parameters to a central entity.

9. The method of claim 7, further comprising transmitting the first raw radar image, the second raw radar image, and the third and fourth coordinates to a central entity.

10. The method of claim 1, further comprising:
receiving updated neural network parameters from a central entity; and
updating the trained neural network using the updated neural network parameters.

11. A non-transitory computer readable medium with instructions stored thereon, wherein the instructions, when executed by a processor, enable the processor to perform the method of claim 1.

12. An apparatus for evaluating radar images, the apparatus comprising:
an input interface configured to receive first and second raw radar images; and
a first circuit configured to:
determine whether a reliability criterion is fulfilled,
in response to the reliability criterion being fulfilled, generate, using a trained neural network, first and second coordinates based on the first and second raw radar images, the first and second coordinates being indicative of an estimate of a position of an object, wherein the first and second coordinates are generated at an output of the trained neural network, and
in response to the reliability criterion not being fulfilled, generate, using a radar processing pipeline different from the trained neural network, third and fourth coordinates based on the first and second raw radar images, the third and fourth coordinates being indicative of the estimate of the position of the object, wherein the radar processing pipeline does not include a neural network, and the radar processing pipeline is configured to be inactive when the reliability criterion is fulfilled.

13. The apparatus of claim 12, further comprising an input/output interface configured to send or receive updated neural network parameters.

14. The apparatus of claim 12, wherein the first circuit is further configured to determine an estimation of a track of the object using the estimate of the position of the object.

15. The apparatus of claim 14, further comprising an output interface configured to transmit the estimate of the position of the object or the track of the object.

16. The apparatus of claim 12, wherein the first circuit comprises a processor configured to determine that the reliability criterion is fulfilled when a deviation of the position from an estimated track of the object is smaller than a threshold.

17. The apparatus of claim 16, wherein the processor is configured to implement the radar processing pipeline, wherein the radar processing pipeline is configured to perform a transformation of the first and second raw radar images into a range/Doppler representation.

18. A radar sensor for generating radar images, the radar sensor comprising the apparatus of claim 12.

19. The radar sensor of claim 18, wherein the radar sensor is a Frequency Modulated Continuous Wave (FMCW) radar sensor.

20. A system comprising:
a plurality of electronic circuits configured to evaluate radar signals, each electronic circuit of the plurality of electronic circuits comprising:
an input interface configured to receive first and second raw radar images, and
a first circuit configured to:
determine whether a reliability criterion is fulfilled,
in response to the reliability criterion being fulfilled, generate, using a trained neural network, first and second coordinates based on the first and second raw radar images, the first and second coordinates being indicative of an estimate of a position of an object, wherein the first and second coordinates are generated at an output of the trained neural network, and
in response to the reliability criterion not being fulfilled, generate, using a radar processing pipeline different from the trained neural network, third and fourth coordinates based on the first and second raw radar images, the third and fourth coordinates being indicative of the estimate of the position of the object, wherein the radar processing pipeline does not include a neural network, and the radar processing pipeline is configured to be inactive when the reliability criterion is fulfilled; and
a central entity configured to:
receive from the plurality of electronic circuits respective neural network parameters,
compute updated neural network parameters based on the received neural network parameters, and
distribute the updated neural network parameters to the plurality of electronic circuits.

* * * * *